United States Patent [19]

Salee

[11] 4,251,429

[45] Feb. 17, 1981

[54] POLYMER BLENDS WITH IMPROVED FLAME RETARDANCE

[75] Inventor: Gideon Salee, Williamsville, N.Y.

[73] Assignee: Hooker Chemicals & Plastics Corp., Niagara Falls, N.Y.

[21] Appl. No.: 863,381

[22] Filed: Dec. 22, 1977

Related U.S. Application Data

[63] Continuation-in-part of Ser. No. 819,539, Jul. 27, 1977, abandoned.

[51] Int. Cl.³ .................... C08K 3/40; C08L 67/02
[52] U.S. Cl. ................... 260/40 R; 260/DIG. 24; 525/437; 525/444
[58] Field of Search ............ 260/860, 40 R; 525/437, 525/444

[56] References Cited

U.S. PATENT DOCUMENTS

| | | | |
|---|---|---|---|
| 3,354,129 | 11/1967 | Edmonds et al. | 260/79 |
| 3,471,441 | 10/1969 | Hindersinn | 260/47 R |
| 3,819,759 | 6/1974 | Weaver et al. | 260/860 |
| 4,020,124 | 4/1977 | Abolins et al. | 260/876 R |
| 4,021,596 | 5/1977 | Bailey | 428/375 |
| 4,045,382 | 8/1977 | Braese et al. | 260/876 R X |
| 4,046,836 | 9/1977 | Adelman et al. | 260/860 |
| 4,075,262 | 2/1978 | Schaefgen | 260/860 |

FOREIGN PATENT DOCUMENTS

2557089 of 1977 Fed. Rep. of Germany.
51-59952 of 1976 Japan.
52-25852 of 1977 Japan.

OTHER PUBLICATIONS

Platzer, *Polymerization Reactions and New Polymers*, (ACS 1973) pp. 80-104.
Ency. Poly. Sci. and Tech., 10, pp. 653-659.
Lyons, *The Chem. and Uses of Fire Retardants* (Wiley-Interscience, 1970), pp. 380-398; 420-423.
Encyclopedia of Polymer Science and Technology, X, pp. 726, 735-759.

*Primary Examiner*—Theodore E. Pertilla
*Attorney, Agent, or Firm*—Peter F. Casella; James F. Mudd; David A. Stein

[57] ABSTRACT

This invention relates to polymer blends having improved hydrolytic stability, moldability and flame retardancy which comprise, in admixture, (1) a linear aromatic polyester prepared from an aromatic dicarboxylic acid reactant and a bisphenol reactant and (2) polyphenylene sulfide. Desirably from about 1 to less than about 50 mole percent of said bisphenol reactant is a halogen-substituted bisphenol.

23 Claims, No Drawings

POLYMER BLENDS WITH IMPROVED FLAME RETARDANCE

CROSS-REFERENCE TO COPENDING APPLICATION

This is a continuation-in-part of copending U.S. patent application Ser. No. 819,539 filed July 27, 1977 abandoned.

BACKGROUND OF THE INVENTION

Linear aromatic polyesters prepared from aromatic dicarboxylic acids and bisphenols are well known for their suitability for molding, extrusion, casting, and film-forming applications. For example, U.S. Pat. No. 3,216,970 to Conix, discloses linear aromatic polyesters prepared from isophthalic acid, terephthalic acid, and a bisphenolic compound. Such high molecular weight compositions are known to be useful in the preparation of various films and fibers. Further, these compositions, when molded into useful articles using conventional techniques, provide properties superior to articles molded from other linear polyester compositions. For instance, aromatic polyesters are known to have a variety of useful properties, such as good tensile, impact, and bending strengths, high thermal deformation and thermal decomposition temperatures, resistance to UV irradiation and good electrical properties.

Aromatic polyesters which are particularly well suited for molding applications may also be prepared by reacting an organic diacid halide with a difunctional aliphatic reactive modifier, such as a glycol, and subsequently reacting this product with a bisphenol compound. The resulting polyesters have reduced melt viscosities and melting points which permits molding at temperatures within the operable limits of conventional molding apparatus (i.e. less than about 300° C.). This type of glycol-modified polyester is more fully disclosed in U.S. Pat. No. 3,471,441, to Hindersinn.

In order to form a successful molding resin on a commercial scale, a polymer should be capable of being molded conveniently without significant degradation in physical properties. In this respect, although the aforementioned aromatic polyesters generally display excellent physical and chemical properties, a persistent and troublesome problem has been their sensitivity to hydrolytic degradation at elevated temperatures. This sensitivity to the combined effects of heat and moisture is also exhibited in commercially available polycarbonate resins as evidenced by the desirability of reducing the water content of the resin to less than about 0.05% prior to molding. Unfortunately, however, the aromatic polyester resins often display a more pronounced tendency to rapidly degrade and embrittle than do polycarbonate resins. This is demonstrated by the loss of tensile strength which can occur when an aromatic polyester resin is molded and subsequently immersed in boiling water. This tendency may be explained, in part, by the hydrolysis of the ester linkages under these conditions. In any event, it is to be appreciated that sensitivity to moisture represents a significant problem in aromatic polyester resins that would significantly limit their commercial utility in applications such as in autoclaves or at elevated temperatures in humid atmospheres.

Accordingly, it is a principal object of this invention to prepare aromatic polyester compositions having superior physical and chemical properties as well as improved hydrolytic stability.

SUMMARY OF THE INVENTION

It has now been found that polyester molding compositions having improved hydrolytic stability may be prepared by blending a linear aromatic polyester with polyphenylene sulfide. Desirably, to provide enhanced flame retardance, about 1 to less than about 50 molar percent of the bisphenols employed in the preparation of the polyester component of the composition of the invention are halogen-substituted bisphenols. The preferred aromatic polyesters of this invention, are prepared from bisphenols and at least one aromatic dicarboxylic acid, most preferably selected from the group consisting of isophthalic acid, terephthalic acid, or mixtures thereof.

DESCRIPTION OF THE PREFERRED EMBODIMENTS

The linear aromatic polyesters of the present invention can be prepared by condensing a diacid halide of a dicarboyxlic acid, dissolved in an organic liquid which is a solvent for the polyester to be formed, with a metal phenolate of a bisphenol, dissolved in a liquid which is immiscible with the solvent for the diacid halide. This process is more fully described in U.S. Pat. No. 3,216,970, to Conix, the disclosure of which is incorporated herein by reference.

The bisphenols employed in the invention are devoid of ethylenic and acetylenic unsaturation. These polyesters and their mixtures with polyphenylene sulfide are non-elastomeric.

The bisphenols which can be used in this process are known in the art and correspond to the general formula:

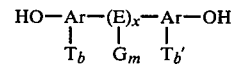

wherein Ar is aromatic, preferably containing 6–18 carbon atoms (including phenyl, biphenyl and naphthyl); G is alkyl, haloalkyl, aryl, haloaryl, alkylaryl, haloalkylaryl, arylalkyl, haloarylalkyl, cycloalkyl, or halocycloalkyl; E is a divalent (or di-substituted) alkylene, haloalkylene, cycloalkylene, halocycloalkylene, arylene, or haloarylene, —O—, —S—, —SO—, —SO$_2$—, —SO$_3$—, —CO—, GP<=O or GN<; T and T' are independently selected from the group consisting of halogen, such as chlorine or bromine, G and OG; m is an integer from 0 to the number of replaceable hydrogen atoms on E; b is an integer from 0 to the number of replaceable hydrogen atoms on Ar, and x is 0 or 1. When there is a plurality of G substituents in the bisphenols, such substituents may be the same or different. The T and T' substituents may occur in the ortho, meta or para-positions with respect to the hydroxyl radical. The foregoing hydrocarbon radicals preferably have carbon atoms as follows: alkyl, haloalkyl, alkylene and haloalkylene of 1 to 14 carbons; aryl, haloaryl, arylene and haloarylene of 6 to 14 carbons; alkylaryl, haloalkylaryl, arylalkyl and haloarylalkyl of 7 to 14 carbons; and cycloalkyl, halocycloalkyl, cycloalkylene and halocycloalkylene of 4 to 14 carbons. Additionally, mixtures of the above described bisphenols may be employed to obtain a polymer with especially desired properties. The bisphenols generally contain 12 to about 30 carbon atoms, and preferably 12 to about 25 carbon atoms.

Typical examples of bisphenols having the foregoing formula include bis(4-hydroxyphenyl)methane, bis(2-hydroxyphenyl)methane, 4-hydroxyphenyl, 2-hydroxyphenyl methane and mixtures thereof; bis(3-methyl-4-hydroxyphenyl)-methane, bis(4-hydroxy-3,5-dichlorophenyl)methane, bis(4-hydroxy-3,5-dibromophenyl)methane, bis(4-hydroxy-3,5-difluorophenyl)methane, bisphenol-A[bis-(4-hydroxyphenyl)-2,2-propane], bis(3-chloro-4-hydroxyphenyl)-2,2-propane, bis(4-hydroxy-3,5-dichlorophenyl)-2,2-propane, bis(4-hydroxynaphthyl)-2,2-propane, bis(4-hydroxyphenyl)phenyl methane, bis(4-hydroxyphenyl)diphenyl methane, bis(4-hydroxyphenyl)-4'-methyl phenyl methane, bis(4-hydroxyphenyl)-4'-chlorophenyl methane, bis(4-hydroxyphenyl)2,2,2-trichloro-1,1,2-ethane, bis(4-hydroxyphenyl)-1,1-cyclohexane, bis(4-hydroxyphenyl)cyclohexyl methane, 4,4-dihydroxyphenyl, 2,2'-dihydroxydiphenyl, dihydroxyhapthylenes, bis(4-hydroxyphenyl)-2,2-butane, bis(2,6-dichloro-4-hydroxyphenyl)-2,2-propane, bis(2-methyl-4-hydroxyphenyl)-2,2-propane, bis(3-methyl-4-hydroxyphenyl)-1,1-cyclohexane, bis(2-hydroxy-4-methylphenyl)-1,1-butane, bis(2-hydroxy-4-terbutylphenyl)-2,2-propane, bis(4-hydroxyphenyl)-1-phenyl-1,1-ethane, 4,4'-dihydroxy-3-methyl diphenyl-2,2-propane, 4,4'-dihydroxy-3-methyl-3'-isopropyl diphenyl-2,2-butane, bis(4-hydroxyphenyl)sulfide, bis(4-hydroxyphenyl)ketone, bis(4-hydroxyphenyl)oxide, bis(4-hydroxyphenyl)sulfone, bis(4-hydroxyphenyl)sulfoxide, bis(4-hydroxyphenyl)sulfonate, bis(4-hydroxyphenyl)amine, bis(4-hydroxyphenyl)phenyl phosphine oxide. 2,2-bis(3-chloro-4-hydroxyphenyl)-propane; 4,4'-(cyclohexymethylene) bis(2,6-dichlorophenol); 2,2-bis-(3,5-dichloro-4-hydroxyphenyl)-propane, 2,2-bis-3,5-dibromo-4-hydroxyphenyl)-propane, 1,1-bis-(3,5-dichloro-4-hydroxyphenyl)-1-phenylethane, 2,2-bis-(3,5-dibromo-4-hydroxyphenyl)-hexane, 4,4'-dihydroxy-3,3', 5,5'-tetra-chlorodiphenyl, 2,2-bis-(3-chloro-4-hydroxyphenyl)-propane, 2,2-bis-(3,5-dibromo-4-hydroxyphenyl)-propane, 2,2-bis-(3,5-dichloro-4-hydroxyphenyl)-propene, tetrachlorodiphenylolsulfane, bis(3,5-dibromo-4-hydroxyphenyl)-phenyl phosphine oxide, bis(3,5-dibromo-4-hydroxyphenyl)-sulfoxide, bis(3,5-dibromo-4-hydroxyphenyl)-sulfone, bis(3,5-dibromo-4-hydroxyphenyl)-sulfonate, bis(3,5-dibromo-4-hydroxyphenyl)-sulfide, bis(3,5-dibromo-4-hydroxyphenyl)-amine, bis(3,5-dibromo-4-hydroxyphenyl)-ketone, and 2,3,5,6,2',3',5',6',-octochloro-4,4'-hydroxy biphenyl. Representative biphenols are o,o-biphenol, m,m'biphenol; p,p'-biphenol; bicresols, such as 4,4'-bi-o-cresol, 6,6-bi-o-cresol, 4,4'-bi-m-cresol; dibenzyl biphenols such as a,a'-diphenol-4,4'-bi-o-cresol; diethyl biphenols such as 2,2'-diethyl-p,p;-biphenol, and 5,5'-diethyl-o,o'-biphenol; dipropyl biphenols such as 5,5'-dipropyl-o,o'-biphenol and 2,2'-diisopropyl-p,p'-biphenol; diallyl biphenols such as 2,2'-diallyl-p,p'-biphenol; and dihalobiphenols, such as 4,4'-dibromo-o,o'-biphenol. Mixtures of isomers of the foregoing bisphenols can be used.

The dicarboxylic acids which are useful in this process are also well known and can be represented by the formula:

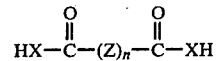

in which X is oxygen or sulfur, Z is alkylene, —Ar— or —Ar—Y—Ar— where Ar has the same definition as given with respect to the bisphenols, Y is alkylene, of 1 to 10 carbons, haloalkylene, —O—, —S—, —SO—, —SO$_2$—, —SO$_3$—, —CO—, GP<=O or GN<; and n is 0 or 1.

Suitable dicarboxylic acids include aromatic dicarboxylic acids such as phthalic acid, isophthalic acid, terephthalic acid, bis(4-carboxy)-diphenyl, bis(4-carboxyphenyl)-ether, bis(4-carboxyphenyl)-sulfone, bis(4-carboxyphenyl)-carbonyl, bis(4-carboxyphenyl)-methane, bis(4-carboxyphenyl)dichloromethane, 1,2- and 1,1-bis(4-carboxyphenyl)-ethane, 1,2- and 2,2-bis(4-carboxyphenyl)-propane, 1,2- and 2,2-bis(3-carboxyphenyl)-propane, 2,2-bis(4-carboxyphenyl)-1,1-dimethyl propane, 1,1- and 2,2-bis(4-carboxyphenyl)-butane, 1,1- and 2,2-bis(4-carboxyphenyl)-pentane, 3,3-bis-(4-carboxyphenyl)-heptane, 3,3-bis(3-carboxyphenyl)-heptane, and aliphatic acids such as oxalic acid, adipic acid, succinic acid, malonic acid, sebacic acid, glutaric acid, azelaic, suberic acid and the like. Isophthalic acid and terephthalic acid are preferred due to their availability and low cost. Most preferably, the dicarboxylic acid component comprises a mixture of about 75 to about 100 mol percent isophthalic acid and about 25 to about 0 mol percent terephthalic acid.

An alternate process for preparing suitable aromatic polyesters, disclosed in U.S. Pat. No. 3,471,441, to Hindersinn et al., the disclosure of which is incorporated herein by reference, comprises the homogeneous reaction of an aliphatic modifier, preferably a glycol of 2 to about 100 carbon atoms, with a diacid halide of a dicarboxylic acid, followed by an interfacial polymerization of the resultant prepolymer with a bisphenol. Compositions prepared by this process have an aliphatic modifier, i.e. a glycol, incorporated into the structure of the reaction product of the bisphenol and diacid halide, and possess excellent engineering properties such as high impact strength, high modulus, improved moldability, and high softening points.

The bisphenol and dicarboxylic acid components which may be employed in the Hindersinn et al. correspond to those described above. The aliphatic modifier is a reactive difunctional component which may be represented by the formula:

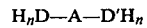

wherein D and D' are independently selected from the group consisting of O, S, and N; A is a bivalent or disubstituted aliphatic radical, free of tertiary carbon atoms, selected from the group consisting of alkylene, cycloalkylene, arylalkylene, alkyleneoxyalkyl, poly(alkyleneoxy)alkyl, alkylenecarboxyalkylene-carboxyalkyl, and poly(alkylenecarboxyalkylene-carboxy)alkyl; and n is an integer from 1 to 2 with n being 2 when D or D' is N. Typical examples of aliphatic modifiers having the foregoing formula include ethylene glycol, diethylene glycol, neopentyl glycol, 1,4-cyclohexane, dimethanol, 1,4-butane dithiol, dipropylene glycol, polypropylene glycol, 1,1-isopropylidenebis(p-phenyleneoxy)di-2-ethanol, 2,2,4,4-tetramethyl-1,3-cyclobutanediol, bis(4-hydroxycyclohexane)-2,2-propane, di(hydroxyethyl)adipate, di(hydroxypropyl)-glutarate, di(hydroxyethyl)poly(ethylene glycol)adipate, ethane dithiol, ethanolamine, methylethanolamine, hexamethylenediamine, 1,3-propanediol, 2-mercaptoethanol, and 2-aminopropanethiol. Combinations of the above-described aliphatic modifiers can also be employed, usually to obtain special properties.

A further process which can be used to prepare linear aromatic polyesters suitable for use in this invention is described and claimed in copending application Ser. No. 818,493 filed July 25, 1977, as a continuation-in-part of application Ser. No. 542,635, filed Jan. 20, 1975, now abandoned. This process basically comprises first mixing a bisphenol, a diaryl ester of a dicarboxylic acid, and an oligomer of a dicarboxylic acid and a diol, and then reacting the resulting mixture in the presence of a transesterification catalyst. The diclosure of this application is incorporated herein by reference.

Solution processes can also be employed in the preparation of suitable aromatic polyesters, such as disclosed in U.S. Pat. Nos. 4,051,107 and 4,051,106, the disclosures of which are incorporated herein by reference.

An additional preparatory process which can be employed in the instant invention is the ester-interchange reaction between a diaryl ester of a dicarboxylic acid and a diphenolic compound such as described in British Pat. No. 924,607, to Imperial Chemical Industries Limited, the disclosure of which is incorporated herein by reference.

The polyesters of the invention which contain a residue of a halogen-substituted bisphenol can also be prepared by the procedures of F. Blaschke et al., German Offenlungsschrift No. 2,557,089 to Dynamit Nobel A.G., (see Example 1) and of A. Lemper et al., copending U.S. application Ser. No. 542,638 filed Jan. 20, 1975, the disclosures of which are incorporated herein by reference.

The polyphenylene sulfide component of the instant invention is a crystalline polymer with a repeating structural unit comprising a para-substituted benzene ring and a sulfur atom which may be described by the formula, where n has a value of at least about 100.

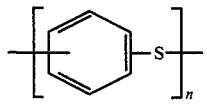

The preparation of polyphenylene sulfide is illustrated in U.S. Pat. No. 3,354,129, to Edmonds, Jr., et al., the disclosure of which is incorporated herein by reference, wherein at least one polyhalo-substituted cyclic compound is reacted with an alkali metal sulfide in a polar organic solvent reaction medium. Suitable polyphenylene sulfide compositions are available commercially under the trade name RYTON of the Phillips Petroleum Company, and include compositions which are either unfilled, or filled with glass or some such conventional material. Preferably, the polyphenylene sulfide component has a melt flow index, measured at 600° F. using a 5 Kg. weight and a standard orifice, within the range of from about 40 to about 7000.

The novel resin compositions of the instant invention are prepared by blending the linear aromatic copolyester with polyphenylene sulfide. The blending or mixing process can be performed using conventional mixing equipment such as, for example, a Banbury mixer, mixing roll, kneader, screw extruder, or injection molding machine. Although the mixing ratio may vary depending on the physical properties desired in the resultant polymer blend, the polyphenylene sulfide component is present preferably in an amount of about 5 parts to about 95 parts by weight of blended polymer, and most preferably, about 5 parts to about 30 parts by weight of polyblend.

According to the invention the flame retardant properties of the present polyester-polyphenylene sulfide mixtures are enhanced when the bisphenol reactant employed to prepare the polyester comprises from about 1 to less than about 50 mole percent of a bisphenol wherein at least one carbon atom is substituted with halogen the balance of said bisphenol reactant being bisphenol devoid of halogen substitution.

The halogen-containing bisphenol of the invention corresponds to the above generic structural formula which defines the bisphenol or bisphenols employed in preparing the polyesters of the invention. According to a preferred embodiment of the invention the halogen substitutents are chlorine or bromine. Preferably the halogen-substituted bisphenol component contains 1 to 20, more preferably 2 to 8, and especially 4 halogen substituents. Preferably at least one of the T and T' in the aforementioned generic bisphenol structural are halogen. In an especially preferred embodiment of the invention all of the halogen substituents of the halogen-substituted bisphenol component are present as T and T'.

The bisphenol component of the invention which is devoid of halogen substitution corresponds to the aforementioned generic structural, (which as pointed out above, broadly defines bisphenols of the invention) when G in the generic formula is alkylaryl, alkylaryl, arylalkyl or cycloalkyl, E is divalent alkylene, cycloalkylene or arylene, —O—, —S—, —SO—, —SO$_2$—, —SO$_3$—, —CO—, GP<=O, or GN<, and T and T' are independently selected from the group consisting of G and OG, (with Ar, m, b, and x of said generic formula having the previously assigned meanings).

While residues of the halogen-substituted bisphenol and the halogen free bisphenol can be present in the same polyester constituent of the present blend it is preferred that the residue of the halogen-containing bisphenol and the residue of the halogen-devoid bisphenol be present in different polyester components of the polyester-sulfide polymer mixture, i.e., the polyester component of the blend preferably comprises:

(A) a polyester of said halogen-substituted bisphenol, and (B) a polyester of said bisphenol devoid of halogen substituents.

Generally when the aforementioned mixture of polyesters is employed according to the foregoing preferred embodiment, the halogen-containing bisphenol polyester is present in an amount of from about 3 to about 40 weight percent, and especially from about 5 to about 20 weight percent, based on the combined weight of the polyphenylene sulfide and all of the polyesters of the present polymer blend.

In the mixture of polyesters preferably employed as the polyester component of the invention, either or both the halogen-containing bisphenol polyester and the halogen free bisphenol polyester may contain residues of aliphatic hydroxy compounds as modifying constituents. However, in accordance with an especially preferred embodiment of the invention the halogen-containing bisphenol polyester constituent of said mixture contains said aliphatic modifier whereas the halogen-free bisphenol polyester constituent is devoid of said aliphatic modifier.

The presence of the halogen-substituted bisphenol in the linear aromatic polyesters according to the invention greatly enhances the flame retardancy of the polyester-sulfide polymer blend without detrimentally affecting the other desirable properties of these compositions. The flame retardance is enhanced to the extent that excellent fire retardant performance is achieved even when the compositions are molded in extremely thin sections, (e.g. of thicknesses less than about 1/16 of an inch). This excellent flame retardance performance makes the present compositions especially suitable for the fabrication of electrical components such as miniature circuit boards and the like.

The novel polymer compositions of the invention may also include various additives such as organic and inorganic fillers, stabilizers, antistatic agents, and the like. However, it is found according to the invention that antimony additives including metallic antimony as well as antimony compounds are detrimental to the flame retardant properties (particularly the Oxygen Index) of the compositions of the invention containing the aforementioned halogen substituted bisphenol residue. Accordingly, it is preferred that the polyester-sulfide polymer mixtures of the invention be devoid of such antimony additives.

The fillers which may be employed in the invention are preferably particulate materials and include conventional particulate fillers such as particulate glass (e.g. chopped glass fiber, glass rovings, glass microballoons, microspheres, or pulverulent glass) as well as clay, talc, mica, inorganic or organic fibers, alumina, graphite, silica, calcium carbonate, carbon black, magnesia and the like. Generally such fillers are added to reinforce the structural integrity of a polymer, e.g. to inhibit sagging and/or to improve the tensile strength and stiffness of the polymer composition and also to reduce shrinkage, minimize crazing, lower material costs, impart color or opacity, and improve the surface finish of the polymer composition. Generally the amount of particulate filler employed in the compositions of the invention is in the range of about 5 to about 70 weight percent, preferably about 5 to about 40 weight percent and especially about 8 to about 30 weight percent based on the combined weight of the polyester constituent and the phenylene sulfide polymer.

In the compositions of the invention wherein flame retardance is enhanced by the presence of the present halogen-substituted bisphenol residue, the filler preferably employed is particulate glass and is especially glass fiber.

The filled mixtures of the invention are prepared by conventional blending techniques employing a conventional mixing apparatus such as a premix mixer or melt extruder to blend the polyester, the sulfide polymer, and filler. The filled compositions can then be molded in an injection molding apparatus or an extruder. The molded articles thus formed have excellent hydrolytic stability and tensile strength.

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts and percentages are by weight.

EXAMPLE 1

Preparation of Linear Aromatic Polyester

A mixture of 165.7 parts isophthaloyl chloride, 29.2 parts terephthaloyl chloride, and 223.5 parts bisphenol-A (2,2-bis(4-hydroxyphenyl)propane) were dissolved in 2270 parts methylene chloride (having a moisture content of 10 ppm of water) in a reactor at 25° C. 200.7 parts triethyl amine were added at a constant rate to the reaction mixture over a period of 7.5 hours, under nitrogen purge with stirring. The reaction mixture was maintained at 15° C. After completion of the trimethylamine addition, the mixture was stirred for two hours at 20° C. 6.8 parts of benzoyl chloride were then added to react with the end-groups of the polymer. After one hour, 13.7 parts isopropanol were added to react with any excess benzoyl chloride. After ½ hour, dilute aqueous hydrogen chloride (570 parts of a 0.5 wt.% sol.) was added to react with any excess triethylamine for an additional ½ hour with stirring. The two phases were then allowed to separate by gravity, and the water phase was removed. Additional washes of the polymer solution with equal amounts of water were carried out until the chloride ion in the polymer solution measured less than 0.1 ppm. The polymer was then precipitated from solution and dried in a vacuum oven until the moisture concentration was less than 0.1 wt.%. The resultant high molecular weight polymer had an intrinsic viscosity of 0.74 dl/g in sym. tetrachloroethane (at 30° C.).

EXAMPLE 2

Preparation of Molding Composition

A linear aromatic polyester was prepared according to the procedure of Example 1 and dried for four hours at 120° C. 100 parts of polyphenylene sulfide (commercially sold under the trade name RYTON V-1 by the Phillips Petroleum Company), having a melt flow index of 6,000 as determined at 600° F. with a 5 Kg. weight using a standard orifice, was added to 900 parts of polyester and tumble mixed for 0.5 to 1 hour. The blend was milled on a two roll Farrell Mill (front roll heated to 480° F., back roll heated to 425° F.) for 1.5-3.0 minutes at 45 r.p.m. The blend was then sheeted, and ground to 4 m.m. granule size on a granulator. The granules were dried for 1-2 hours at 120° C. and injection molded to produce tensile and flex bars. The injection molding conditions were as follows:

| MOLDING PARAMETERS | |
|---|---|
| Barrel Temperature (°F.) | 600 |
| Nozzle Temperature (°F.) | 580 |
| Mold Temperature (°F.) | 250 |
| Screw Speed (rpm) | 120 |
| Back Pressure (psi) | 625 |
| Injection Pressure (psi) | 11,200 |
| Plasticating Time (secs) | 8 |
| Fill Time (secs) | 3 |
| Total Injection Time (secs) | 10 |

The tensile bars thus prepared were tested and found to have the following physical properties. By way of comparison, a control, which does not include polyphenylene sulfide, is also shown.

| PROPERTIES | | |
|---|---|---|
| | Example 2 | Control |
| Tensile Strength (psi) | 10,150 | 10,000 |
| Tensile Modulus (psi × 10$^5$) | 3.09 | 3.34 |
| After 7 days immersion in boiling H$_2$O: | | |
| Tensile Strength (psi) | 10,800 | 1,700 |
| Tensile Modulus (psi × 10$^5$) | 3.43 | 2.75 |

EXAMPLES 3-6

Preparation of Molding Composition

A linear aromatic polyester was prepared according to the procedure of Example 1 and dried for four hours at 120° C. The procedure of Example 2 was followed to produce 4 mm granules.

The granules were dried for 4 hours at 120° C. and were then blended with polyphenylene sulfide pellets (commercially sold by the Phillips Petroleum Corp. under the tradename RYTON 6), having a melt flow index of 50 as determined at 600° F. with a 5 Kg. weight using a standard orifice in various mixing ratios. Tensile bars were prepared and tested, and the results are summarized in Table 1 below.

The aromatic polyesters of the invention generally have an intrinsic viscosity of at least 0.5 dl/g when measured in sym. tetrachloroethane at 30° C., and preferably at least 0.6 dl/g.

the bisphenol solution were added simultaneously over a period of 2 hours and 10 minutes to the mixture in the larger Pfaudler reactor, which was maintained at a temperature of about 13° to 19° under vigorous agitation. On completion of the addition of the bisphenol solution, the smaller Pfaudler reactor was rinsed with 45.4 kg. of methylene chloride and the methylene chloride rinse was added to the mixture in the larger Pfaudler reactor. The agitation of the reaction mixture in the larger Pfaudler reaction vessel was continued for about 14 hours.

About 2 liters of concentrated aqueous hydrochloric acid which had been diluted by addition of about 25 gallons of distilled water was then added to the reaction mixture in the larger Pfaudler reactor to terminate the esterification reaction. The resultant reaction mixture which consisted of a lower organic liquid phase containing the polyester product and an upper aqueous phase was removed from the reaction vessel and the layers thereof were separated. The recovered organic layer was washed clean of chloride anion with water.

The polyester product was recovered by drowning the washed organic layer gradually in about 50 gallons of vigorously agitated water at about 60° to 70° in a vessel equipped with a bottom outlet. During the drowning operation the methylene chloride was flashed from the drowned mixture and the polyester precipitated as a white solid. The product was s withdrawn from the aforementioned bottom outlet as an aqueous

TABLE 1

| | EXAMPLE 3 | EXAMPLE 4 | EXAMPLE 5 | EXAMPLE 6 |
|---|---|---|---|---|
| COMPOSITION | | | | |
| Polyester (parts) | 475 | 450 | 425 | 400 |
| Polyphenylene Sulfide (parts) | 25(5%) | 50(10%) | 75(15%) | 100(20%) |
| PROPERTIES | | | | |
| Tensile Strength (psi) | 10,200 | 10,200 | 10,400 | 10,500 |
| Tensile Modulus (psi × 10$^5$) | 3.07 | 3.26 | 3.26 | 3.61 |
| After 7 days immersion in boiling water: | | | | |
| Tensile Strength (psi) | 4,700 | 7,800 | 8,000 | 9,800 |
| Tensile Modulus (psi × 10$^5$) | 3.43 | 3.48 | 3.43 | 3.68 |
| MOLDING CONDITIONS | | | | |
| Barrel Temperature (°F.) | 600 | 600 | 600 | 600 |
| Mold Temperature (°F.) | 250 | 250 | 250 | 250 |
| Injection Pressure (psi) | 23,300 | 18,900 | 16,600 | 14,400 |
| Screw Speed (rpm) | 230 | 230 | 230 | 240 |
| Plasticating Time (secs) | 9 | 8 | 8 | 7 |
| Fill Time (sec) | 4 | 6 | 4 | 5 |
| Total Injection Cycle (sec) | 40 | 40 | 40 | 40 |

EXAMPLE 7

Preparation of a Linear Aromatic Polyester of a Halogen-Containing Bisphenol

A mixture of 7.443 kg. of isophthaloyl chloride, 7.443 kg. of terephthaloyl chloride and 227 kg. of methylene chloride were charged under an atmosphere of dry nitrogen to a 100 gallon glass lined Pfaudler reactor equipped with agitation means. In a 50 gallon glass lined Pfaudler reactor also equipped with agitation means and connected by a delivery tube to the previously described reactor, a mixture of 29.91 kg. of 2,2-bis(4-hydroxy-3,5 dibromophenyl)propane, 2.17 kg. of 1,6-hexane diol and 136 kg. of methylene chloride under an atmosphere of dry nitrogen was agitated to dissolve the halogen-containing bisphenol in the methylene chloride solvent. A 2 gallon addition tank also connected by a delivery tube to the larger Pfaudler reactor was charged with 22.5 liters of trimethylamine under an atmosphere of dry nitrogen. The trimethylamine and slurry which was centrifuged to separate the water from the solid product. The product was dried with agitation in vacuo at about 100° for about 16 hours. The recovered polyester was obtained in a yield of about 90% of theory.

The resultant polyester product contains halo bisphenol hexane diol isophthalate and terephthalate residues in the molar proportions 0.75:0.25:0.5:0.5, has an intrinsic viscosity of 0.41, glass transition temperature of 198°-207°, a weight average molecular weight of 60,200 and a number average molecular weight of 21,400. By analysis the actual bromine content of the polyester product is 41.89% (theoretical: 42.2%).

EXAMPLE 8

About 324 parts of a bisphenol A-isophthalate polyester resin having an isophthalate:terephthalate ratio of 5.67 which was prepared substantially as described in Example 1 was dried for about 4 hours at 120° and charged gradually to the Farrell Mill described in Example 2 which was operated with its front roll at 450° F. and its back roll at 410° F. until fusion of the resin was completed and a band of clear resin formed on the front roll.

On completion of the addition of the halogen-free bisphenol polyester, 40 parts of the halogen-containing bisphenol polyester of Example 7 which had been dried for about 4 hours at 80° C. were gradually charged to the mill until fusion of the resin was completed and a band of clear resin formed on the front roll.

On completion of addition of the halogen-containing bisphenol polyester about 36 parts of the polyphenylene sulfide of Example 2 were added to the mill.

The mixture of resins was milled for about 1.5 to 3 minutes and then sheeted from the mill. The milled resin blend was ground to granules of about 4 m.m. granule size as described in Example 2 which were then dried at about 120° for about 4 hours.

The dried resin blend granules were charged to an Arburg 221E/150 Injection molding machine operated at a barrel temperature of 590° F., a mold temperature of 250° F. and an injection pressure of about 25,000 psi to injection mold the resin blend into specimen bars of about 5 inch length, ½ inch width and 1/16 inch thickness. Several of 1/16 inch thickness specimen were reserved for the flame retardant test described hereinbelow. The remainder of the 1/16 inch thick specimen bars were dried at 120° for 2 hours and compression molded in a Carver Four Paten Laboratory Press operated at 400°-420° F. at a pressure of 30,000 to 35,000 psi to obtain specimen bars 5 inches in length, ½ inch in width and 1/32 inch in thickness.

The 1/16 inch- and 1/32 inch-thick bar specimens were evaluated in flame retardant properties according to the Vertical Burning Test described in "UL94-Standards For Safety", Underwriters Laboratories, Inc. Second Revised Edition, May 2, 1975, pages 6-8. In accordance with the evaluation technique of the aforementioned test, the specimens were rated V-0, V-1, or V-2 with V-0 indicating the greatest degree of flame retardancy and V-2 indicating the poorest degree of flame retardance. The Oxygen Index of a sample of injected molded resin blend obtained from the Arburg Injection molding machine is also determined.

The results of these experiments are reported in Table 2 below.

EXAMPLE 9

The procedure of Example 8 was repeated substantially as described except that the amount of the halogen-free bisphenol polyester, the halogen containing bisphenol polyester and the polyphenylene sulfide were 288 parts, 80 parts and 32 parts, respectively. The results of this Example are also presented in Table 2 below.

EXAMPLE 10

A glass fiber filled polyester-polyphenylene sulfide blend was prepared by charging 450 parts of the halogen-free bisphenol polyester of Example 1, 55.6 parts of the halogen-containing bisphenol polyester of Example 7 and 50 parts of the polyphenylene sulfide of Example 2 to the Farrell Mill operated at the conditions described in Example 8. The addition and milling procedure used was substantially that described in Example 8. The sheet of resin blend recovered from the mill was ground to granules and dried substantially as described in Example 8.

The dried granules were mixed with 61.7 parts of chopped glass fiber (3/16 inch length, manufactured by Owens Corning Fiberglass Corporation under the designation 419AA). The resultant mixture was then added to an Arburg Alrounder 200 injection molding machine operated at a barrel temperature of 590° F., a mold temperature of 210°-220° F., and an injection pressure of about 18,000 psi.

The mixture was molded as bar specimens which were subsequently reground and dried substantially as described hereinabove to ensure that a homogeneous mixture of the glass fibers with the resin blend was obtained. The dried reground mixture was then charged to the Arburg 221E/150 Injection molding machine (operated at a barrel temperature of 580° F., at a mold temperature of 250° F., and an injection pressure of about 20,000 psi) and molded as 5 inch×½ inch×1/16 inch specimen bars as described in Example 8. As in Example 8, a portion of the latter specimen bars were reserved for flame retardant testing and the remainder were compression molded to obtain 5 inch×½ inch×1/32 inch bar specimens. Both the 1/16 inch and 1/32 inch bar samples were tested for flame retardance as described in Example 8. The Oxygen Index of the product was also determined as in Example 8. The results of this Example are reported in Table 2 below.

EXAMPLE 11

The procedure of Example 10 was repeated substantially as described except 63.0 parts of the glass filler was employed and 11 parts of antimony trioxide were added to the resin mixture in the Farrell mill following the addition of the polyphenylene sulfide. The resultant molded product was tested for flame retardance substantially as described in Example 8. The results of this Example are also presented in Table 2 below.

EXAMPLES 12-24

In these Examples there were prepared and tested for flame retardance compositions which were substantially comparable to those of Examples 8, 10 and 11 except that one or more of the constituents of the compositions described in the latter Examples were omitted. Where glass fibers were present as a constituent in the compositions of the present Examples, the preparatory procedure of Example 10 was employed substantially as described. Where antimony trioxide was present as a constituent in the compositions of of the present Examples, the antimony compound addition procedure of Example 11 was followed substantially as described. Where a glass constituent and and an antimony additive were not employed, the compositions of the present Examples were prepared substantially as described in Example 8.

The results of these experiments are also presented in Table 2 below.

TABLE 2

| | EXAMPLE: (Control Examples in Parenthesis) | | | | | | | | | | | | | | | | |
|---|---|---|---|---|---|---|---|---|---|---|---|---|---|---|---|---|---|
| | 8 | 9 | 10 | 11 | (12) | (13) | (14) | (15) | (16) | (17) | (18) | (19) | (20) | (21) | (22) | (23) | (24) |
| CONSTITUENTS (parts) | | | | | | | | | | | | | | | | | |

TABLE 2-continued

| | 8 | 9 | 10 | 11 | (12) | (13) | (14) | (15) | (16) | (17) | (18) | (19) | (20) | (21) | (22) | (23) | (24) |
|---|---|---|---|---|---|---|---|---|---|---|---|---|---|---|---|---|---|
| Halogen-free Bisphenol-A-Isophthalate-Terephthalate Polyester | 324 | 288 | 450 | 450 | 1000 | 1500 | 450 | 450 | 450 | 360 | 320 | 360 | 450 | 450 | 450 | 450 | 450 |
| Halogen-Containing Bisphenol-A-Hexane Diol-Modified Isophthalate-Terephthalate Polyester | 40 | 80 | 55.6 | 55.6 | — | — | — | — | — | 40 | 80 | 40 | 50 | 50 | — | — | — |
| Polyphenylene Sulfide * | 36 | 32 | 50 | 50 | — | 167 | 50 | 50 | 50 | — | — | — | — | — | — | — | — |
| Glass Fiber | — | — | 61.7 | 63.0 | — | — | 58.3 | 58.3 | — | — | — | — | 55.6 | 57 | 52.5 | — | 52.5 |
| Antimony Oxide($Sb_2O_3$) | — | — | — | 11.1 | — | — | — | 5 | 5 | — | — | 8 | — | 10 | — | 4.7 | 4.7 |
| Vertical Burning Test Evaluations (UL-94) | | | | | | | | | | | | | | | | | |
| 1/16 inch thickness specimen | V-0 | V-0 | V-0 | V-0 | ** | V-0 | V-0 | V-2 | V-2 | V-0 | V-0 | V-0 | V-0 | V-0 | V-0 | V-2 | V-2 |
| 1/32 inch thickness specimen | V-0 | V-0 | V-0 | V-0 | V-1 | V-2 | V-0 | V-2 | V-2 | V-0 | V-0 | V-O | V-O | V-0 | V-0 | V-2 | V-2 |
| Oxygen Index | 42.5 | 45.0 | 41.1 | 40.5 | 37.2 *** | 35.0 | 38.5 | 35.9 | 35.1 | 41.0 | 42.4 | 41.0 **** | 41.6 | 40.5 | 40.4 | 37.2 | 37.5 |

\* Pure polyphenylene sulfide, because of its extreme brittleness, could not be made into 1/16 inch or thinner molded specimens and hence could not be tested for flame retardance.
\*\* Not determined.
\*\*\* Average of eight determinations ranging from 34.8 to 40.1.
\*\*\*\* Molded product is undesirably brittle.

The invention has been described in the above specification and illustrated by reference to specific embodiments in the illustrative examples. However, it is to be understood that these embodiments are not intended to limit the invention since changes and modifications in the specific details disclosed hereinabove can be made without departing from the scope or spirit of the invention.

What is claimed is:

1. In a thermoplastic polymeric composition having improved hydrolytic stability comprising in admixture (a) a polyphenylene sulfide and (b) a linear aromatic polyester, or a mixture of said polyesters, of components comprising a dicarboxylic acid and a bisphenol, the improvement wherein the bisphenol component comprises both a bisphenol wherein at least one carbon atom is substituted with halogen, and a bisphenol devoid of said halogen, said halogen-containing bisphenol being present in the amount of about 1 to less than about 50 mole percent based on the total bisphenol component.

2. The composition of claim 1 which comprises a mixture of polyesters comprising:
   (A) a polyester of said bisphenol devoid of halogen, and
   (B) a polyester of said halogen-containing bisphenol, said halogen-containing bisphenol polyester being present in an amount of from about 3 to about 40 weight percent based on the combined weight of the polyesters and the polyphenylene sulfide.

3. The composition of claim 2 wherein the dicarboxylic acid component of the polyesters has the formula:

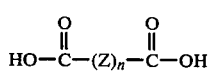

wherein Z is alkylene, —Ar— or —Ar—Y—Ar— where —Ar— is aromatic, Y is alkylene, haloalkylene, —O—, —S—, —SO—, —$SO_2$—, —$SO_3$—, —CO—, GP<=O or GN<, where G is alkyl, haloalkyl, aryl, haloaryl, alkylaryl, haloalkylaryl, arylalkyl, haloarylalkyl, cycloalkyl or cyclohaloalkyl, and n is 0 or 1, and the polyphenylene sulfide is present in an amount of about 5 to about 95 weight percent of the combined weight of the polyesters and the polyphenylenesulfide.

4. The composition of claim 3 wherein the dicarboxylic acid is an aromatic dicarboxylic acid, and said halogen-containing bisphenol contains up to 20 halogen substituents and is present in an amount of about 5 to about 20 weight percent based on the weight of the polyesters and the sulfide polymer.

5. The composition of claim 4 wherein said bisphenol devoid of halogen has the formula:

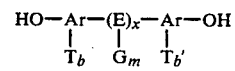

wherein Ar is aromatic, G is alkyl, aryl, alkylaryl, arylalkyl, or cycloalkyl; E is divalent alkylene, alkylene, cycloalkylene, or arylene, —O—, —S—, —SO—, —$SO_2$—, —$SO_3$—, —CO—, GP<=O or GN<; T and T' are independently selected from the group consisting of G and OG; m is an integer from 0 to the number of replaceable hydrogen atoms on E; b is an integer from 0 to the number of replaceable hydrogen atoms on Ar, and x is 0 or 1, and said halogen-containing bisphenol has the formula:

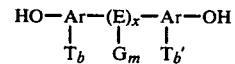

wherein G is alkyl, haloalkyl, aryl, haloaryl, alkylaryl, haloalkylaryl, arylalkyl, haloarylalkyl, cycloalkyl, or halocycloalkyl; E is divalent alkylene, haloalkylene, cycloalkylene, halocycloalkylene, arylene, or haloarylene, —O—, —S—, —SO—, —$SO_2$—, —$SO_3$—, —CO—, GP<=O or GN<; T and T' are independently selected from the group consisting of halogen, G and OG; and Ar, x, m, and b have the aforementioned meanings.

6. The composition of claim 5 wherein the halogen-containing bisphenol contains up to 8 halogen substituents on different carbon atoms of said bisphenol.

7. The composition of claim 6 wherein the halogen is chlorine or bromine with at least one of T and T' being halogen.

8. The composition of claim 1 wherein said linear aromatic polyester includes an aliphatic modifier.

9. The composition of claim 8 wherein said aliphatic modifier is a glycol, of 2 to about 100 carbon atoms.

10. The composition of claim 9 wherein said glycol is selected from the group consisting of neopentyl glycol, diethylene glycol, 1,6 hexane diol ethylene glycol, and mixtures thereof.

11. The composition of claim 7 wherein said linear aromatic polyester of the halogen-containing bisphenol includes an aliphatic modifier and all of the halogen substituents are present as T and T'.

12. The composition of claim 11 wherein said aliphatic modifier is a glycol, of 2 to about 100 carbon atoms.

13. The composition of claim 12 wherein said glycol is selected from the group consisting of neopentyl glycol, diethylene glycol, 1,6-hexane diol ethylene glycol, and mixtures thereof.

14. The composition of claim 13, wherein the bisphenol devoid of halogen is bisphenol A, T and T' in the halogen-containing bisphenol are bromine and the aromatic dicarboxylic acid is selected from the group consisting of isophthalic acid, terephthalic acid and mixtures thereof.

15. The composition of claim 14 wherein the halogen-containing bisphenol is 2,2-bis-(4,4-hydroxy-3,5-dibromophenyl)propane, the dicarboxylic acid is a mixture of isophthalic and terephthalic acids and the polyphenylene sulfide is present in an amount of about 5 to about 30 weight percent based on the weight of the polyesters and the polyphenylene sulfide.

16. The composition of claim 1 wherein said polyphenylene sulfide has a melt flow index in the range of from about 40 to about 7000.

17. The composition of claim 1 which also includes a filler material.

18. The composition of claim 17 wherein said filler material is particulate glass.

19. The composition of claim 18 wherein said particulate glass is present in an amount of about 5 to 70 weight percent based on the combined weight of the polyester and polyphenylene sulfide.

20. The composition of claim 1 wherein an antimony component is substantially absent.

21. A molded article formed from the composition of claim 1.

22. A molded article formed from the composition of claim 17.

23. A molded article formed from the composition of claim 20.

* * * * *